US007004871B2

(12) United States Patent
Tanikawa (10) Patent No.: US 7,004,871 B2
(45) Date of Patent: Feb. 28, 2006

(54) AUTOMATIC TRANSMISSION APPARATUS (75) Inventor: Naoya Tanikawa, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 31 days.

(21) Appl. No.: 10/799,629

(22) Filed: Mar. 15, 2004

(65) Prior Publication Data
US 2004/0242358 A1 Dec. 2, 2004

(30) Foreign Application Priority Data
Mar. 14, 2003 (JP) ............................. 2003-070947

(51) Int. Cl.
F16H 13/06 (2006.01)
(52) U.S. Cl. .................. 475/114; 475/116; 475/146; 475/159; 475/161; 74/339; 74/440; 192/70.12; 192/85 AA; 192/112; 192/113.34
(58) Field of Classification Search ................ 475/114, 475/116, 146, 159, 161; 192/85 AA, 70.12, 192/112, 113.34; 74/339, 440
See application file for complete search history.

(56) References Cited
U.S. PATENT DOCUMENTS
4,241,622 A * 12/1980 Kubo et al. .................. 475/59
5,230,664 A * 7/1993 Michioka et al. ............. 474/43
5,607,371 A * 3/1997 Yamaguchi .................. 475/210
5,967,929 A * 10/1999 Matsuoka et al. ........... 475/159
6,595,340 B1 * 7/2003 Moorman et al. ....... 192/85 AA
2004/0121878 A1 * 6/2004 Tanikawa .................... 475/290
2004/0138022 A1 * 7/2004 Tanikawa .................... 475/159

FOREIGN PATENT DOCUMENTS
JP 61041048 A * 2/1986
JP 6-221400 8/1994

* cited by examiner

Primary Examiner—Charles A. Marmor
Assistant Examiner—David D. Le
(74) Attorney, Agent, or Firm—Buchanan Ingersoll PC (57) ABSTRACT An automatic transmission apparatus comprising, a first member rotating integrally with an input shaft and including a first cylindrical portion having an inner spline at an inner peripheral surface, a second member including a second cylindrical portion having an outer spline for engaging with the inner spline of the first member and a depressed portion formed on the second member and a clearance, which establishes a communication between an inner portion surrounded by the first and the second members and an outer portion of the first and the second members, is formed between the depressed portion of the second member and the inner surface of the first member.

6 Claims, 6 Drawing Sheets

AUTOMATIC TRANSMISSION APPARATUS

This application is based on and claims priority under 35 U.S.C. § 119 with respect to Japanese Application No. 2003-070947 filed on Mar. 14, 2003, the entire content of which is incorporated herein by reference.

FIELD OF THE INVENTION

This invention generally relates to an automatic transmission apparatus. More particularly, the present invention pertains to the automatic transmission apparatus in which oil is returned into an oil pan as much as possible.

BACKGROUND OF THE INVENTION

According to a known automatic transmission apparatus, a rotation force generated by an engine is transmitted into the automatic transmission apparatus through a torque converter, and outputs a specified rotation speed obtained by converting the rotation speed of the input shaft, then the rotation force is transmitted to a driving wheel. The automatic transmission apparatus has a gear unit being a combination of gears of many sizes, and friction engaging elements such as a clutch and a brake are engaged for outputting a rotation of the selected gear. In this way, multiple rotation speeds can be shifted and transmitted through the automatic transmission apparatus.

The automatic transmission apparatus includes an oil pan provided under an automatic transmission case for storing oil used for cooling down and lubing rotating members such as the gears and a bearing. The oil stored in the oil pan is pumped by an oil pump through a strainer and provided to each rotating member. When each rotation member is rotated, the oil provided to each rotation member flies in all directions within the automatic transmission case in response to the centrifugal force of the rotating members. Then, the oil runs down due to gravitation and returns into the oil pan.

Figure 5:
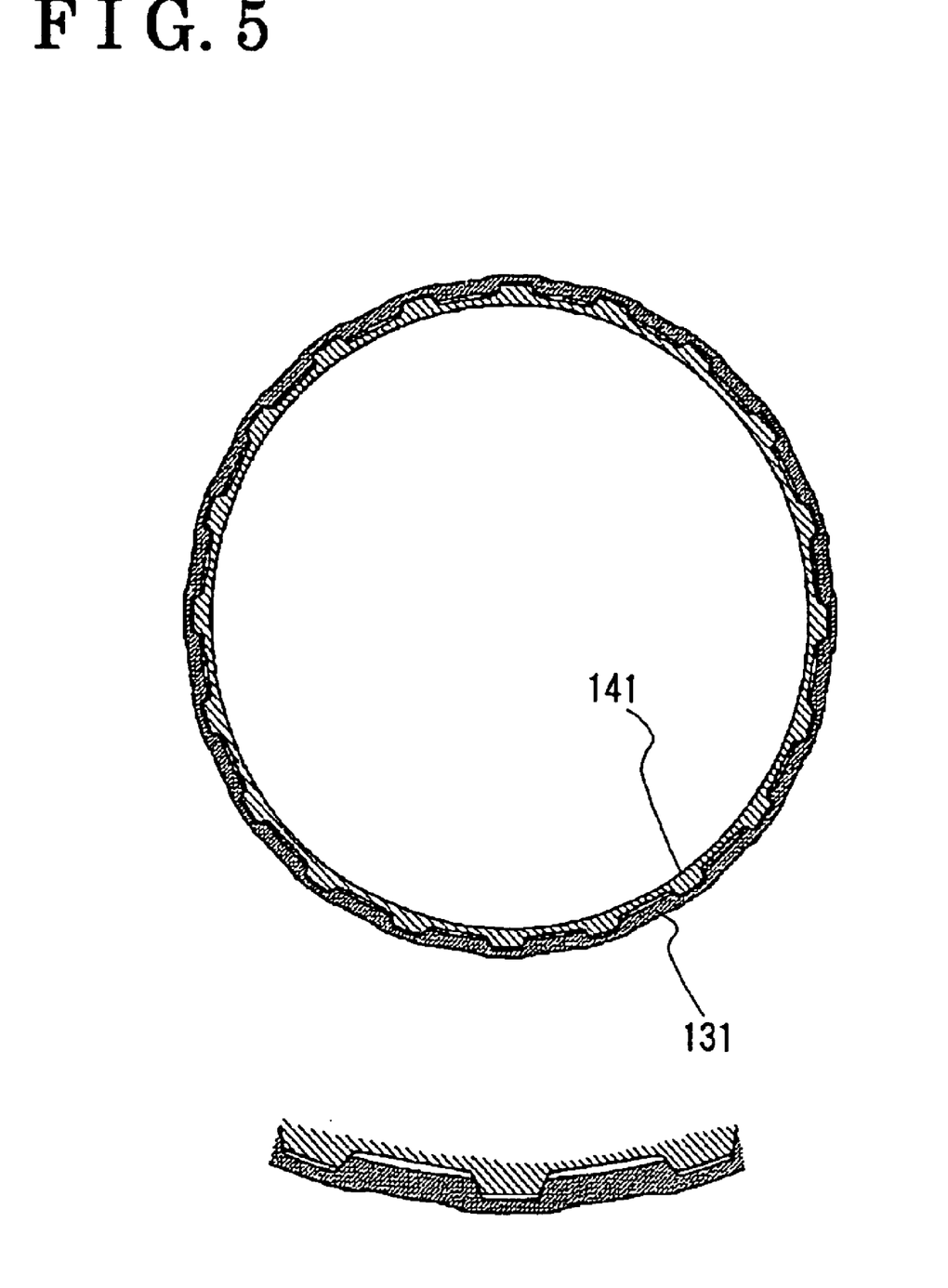
FIG. 5 illustrates a cross sectional view of an enlarged elements indicating a engagement condition between a sun gear hub and a second clutch drum according to the embodiment of a known automatic transmission apparatus.

According to a forward and rear drive switching device of the known automatic transmission apparatus, a forward drive clutch drum is provided integrally with the input shaft, and a hub is provided integrally with a sun gear. The drum-shaped hub includes a cylindrical portion at the outer peripheral portion thereof extending in a direction away from the sun gear. The cylindrical portion includes a spline at an outer peripheral surface thereof, and the forward drive clutch drum is engaged with the spline (Refer to FIG. 5). An oil pass runs through from an inner peripheral portion of the sun gear to an outer peripheral portion of the sun gear, and one end of the oil pass on the sun gear's outer peripheral portion may be positioned between the gear portion and a hub connecting portion of the sun gear. (e.g. Japanese Patent Application Laid-Open Publication as H6 (1994)-221400, FIG. 1)

In the aforementioned forward and rear drive switching device of the known automatic transmission apparatus, however, the oil will remain inside the drum-shaped hub. In other words, the oil provided through the oil pass of the sun gear for lubing the forward driving clutch is spread to the inner side of the hub as well as the back side of the hub. The oil flow at inner of the hub may be prevented due to the engagement between the hub and the forward driving clutch drum, so that the oil tend to remain inside of the hub.

When the oil remains in the hub, problems may be occurred. If the capacity of the oil pan is not enough, the small amount of the oil is used for the automatic transmission apparatus. In this configuration, after a while the engine is started, the oil pump sucks out the oil from the oil pan, and then as the amount of the oil in the oil pan is decreased, the oil pump may suck the air. When the oil pump sucks the air, following problems may be occurred. Firstly, the oil pump will make a noise. Secondly, if the oil mixed with the air flows into a valve body provided at the downstream of the oil pump, an oil pressure might be changed, as a result a shift quality may be declined. Finally, a required oil pressure is not secured with the oil mixed with the air (refer to FIG. 6), and the engaging force of the clutch becomes weak, as a result, the clutch plates of the clutch may slide and burn.

To avoid aforementioned problems, the oil amount might be increased, however, if high-temperature friction members are soaked in the oil, the oil increases in temperature and deteriorates quickly. In addition, it becomes difficult to balance the friction qualities on both of the low-temperature side and the high-temperature side.

When the capacity of the oil pan is enough, sufficient amount of oil can be used and stored in the oil pan, so that the oil returned from the transmission apparatus side into the oil pan before the oil in the oil pan runs out. In this configuration, the aforementioned problems can be prevented, however, when the automatic transmission apparatus is provided, onto the a vehicle such as a truck whose loading space is provided on a chassis thereof and vehicle height is limited, the capacity of the oil pan is limited, as a result, the aforementioned problems can not be avoided.

Furthermore, when the vehicle is traveling, the output member such as an output shaft and a planetary gear are also rotated, so that the oil is smoothly returned from the transmission apparatus side, and the aforementioned problems can be avoided. On the other hand, when the vehicle is in an idling condition, the oil is not returned smoothly from the transmission apparatus side because the output member of the automatic transmission apparatus is not rotating, so that the aforementioned problems cannot be avoided. When the engine just starts, and the oil temperature is low, an oil's flow resistance increases, as a result, the oil is not flied even if the centrifugal force is applied, and the oil may not run down and may remain on the surface of the each rotating member. Such oil is not returned to the oil pan, and the oil amount returned to the oil pan is decreased, finally the oil level in the oil pan becomes lower.

The present invention therefore seeks to provide an automatic transmission apparatus in which the oil is returned into the oil pan as much as possible even if a capacity of the oil pan is not enough. The present invention also seeks to provide an automatic transmission apparatus in which the oil is returned into the oil pan as much as possible when the vehicle is in the idling condition. The present invention further seeks to provide an automatic transmission apparatus in which the oil is returned into the oil pan as much as possible when the oil temperature is low.

SUMMARY OF THE INVENTION

An automatic transmission apparatus includes a first member rotating integrally with an input shaft and including a first cylindrical portion having an inner spline at an inner peripheral surface thereof, a second member including a second cylindrical portion having an outer spline at an outer peripheral surface thereof for engaging with the inner spline of the first member, a depressed portion formed at part of or all of groove bottoms of the outer spline of the second member, and a clearance provided between the depressed portion of the second member and the inner spline of the first member when the inner spline of the first member engages with the outer spline of the second member, and communicating an inner portion surrounded by the first member and the second member to an outer portion thereof.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

A preferred embodiment of the present invention will be described hereinbelow in detail with reference to the accompanying drawings.

Figure 1:
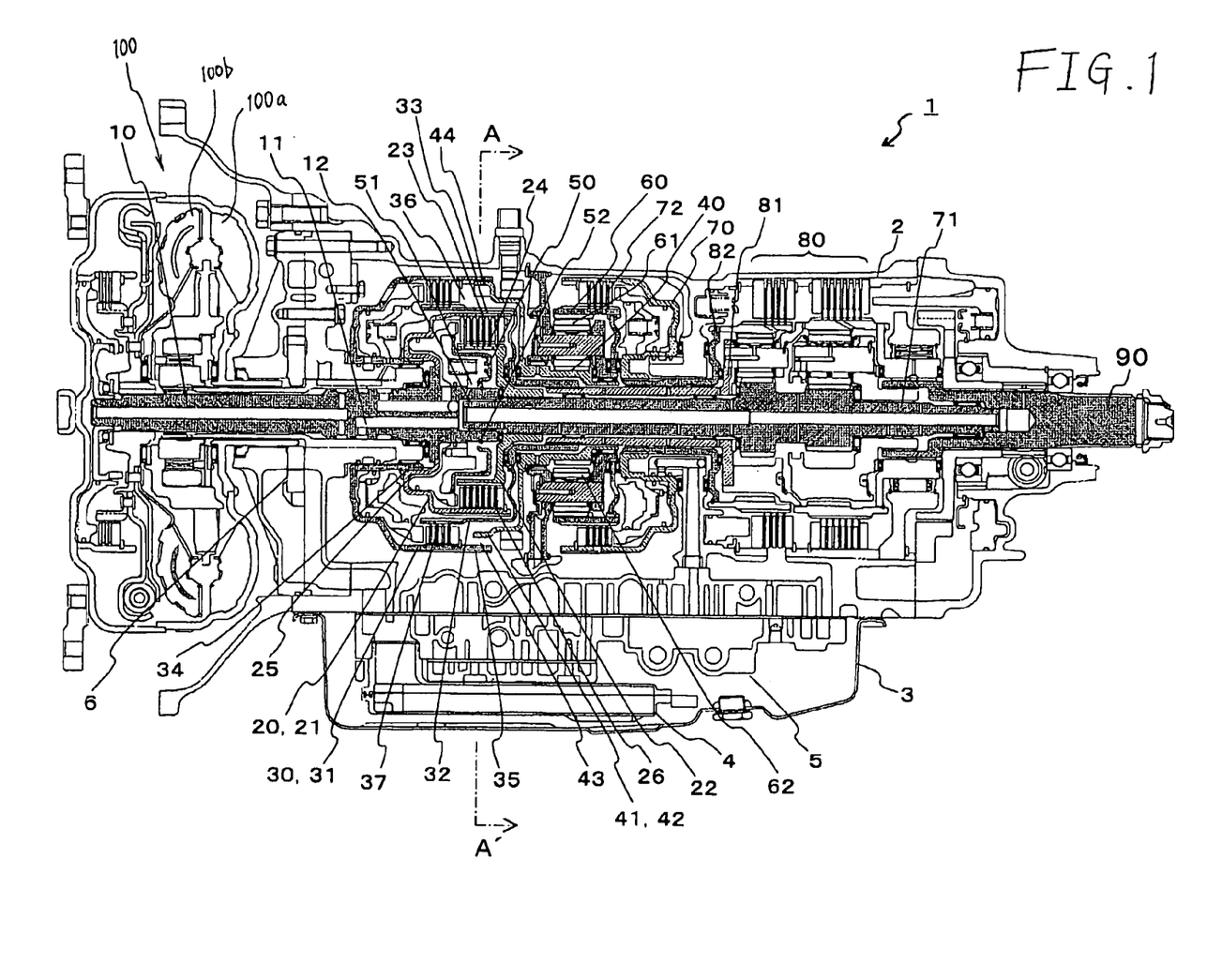
FIG. 1 illustrates a cross sectional view of a configuration of an automatic transmission apparatus according to an embodiment of the current invention.
Figure 2:
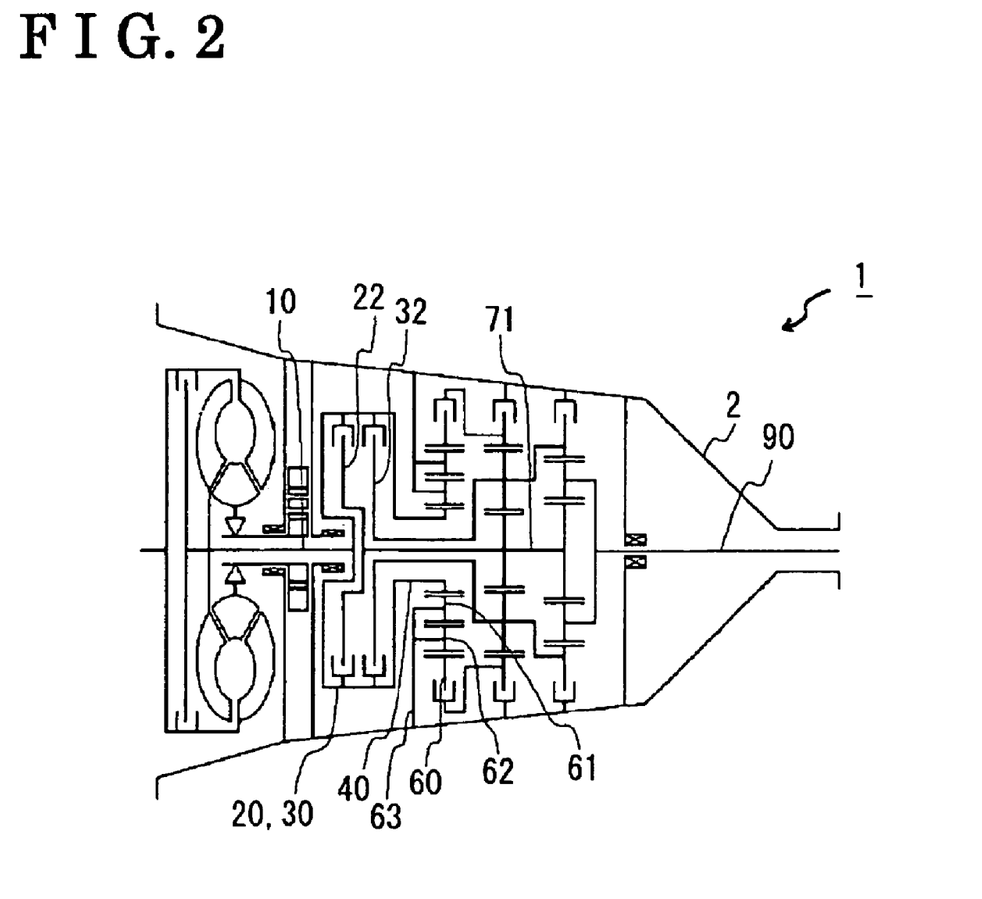
FIG. 2 illustrates a schematic skeleton diagram of the configuration of the automatic transmission apparatus according to the embodiment of the current invention.
Figure 3:
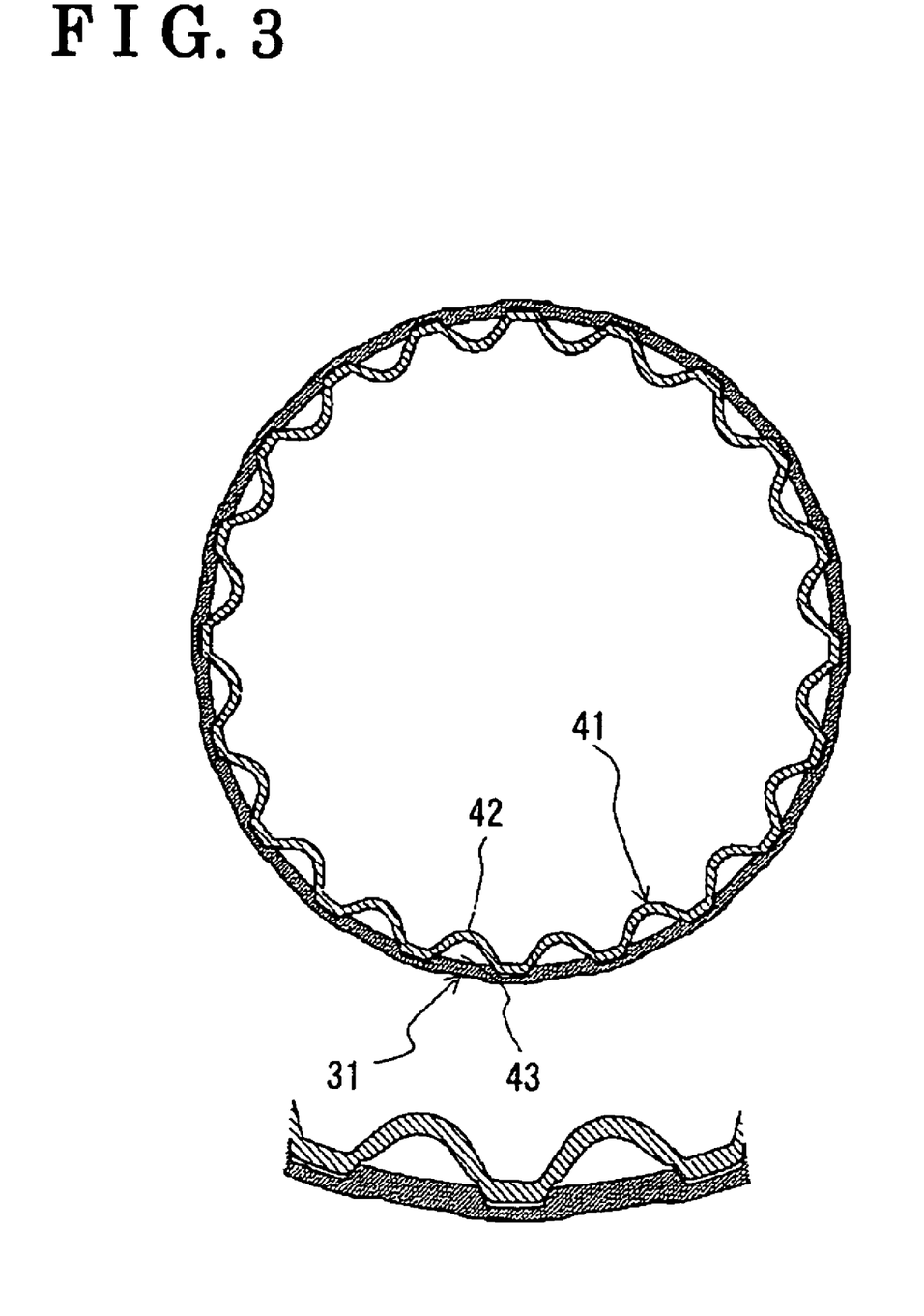
FIG. 3 illustrates a cross sectional view of an enlarged elements along a line A—A in FIG. 1 indicating a engagement condition between a sun gear hub and a second clutch drum according to the embodiment of the current invention.
Figure 4:
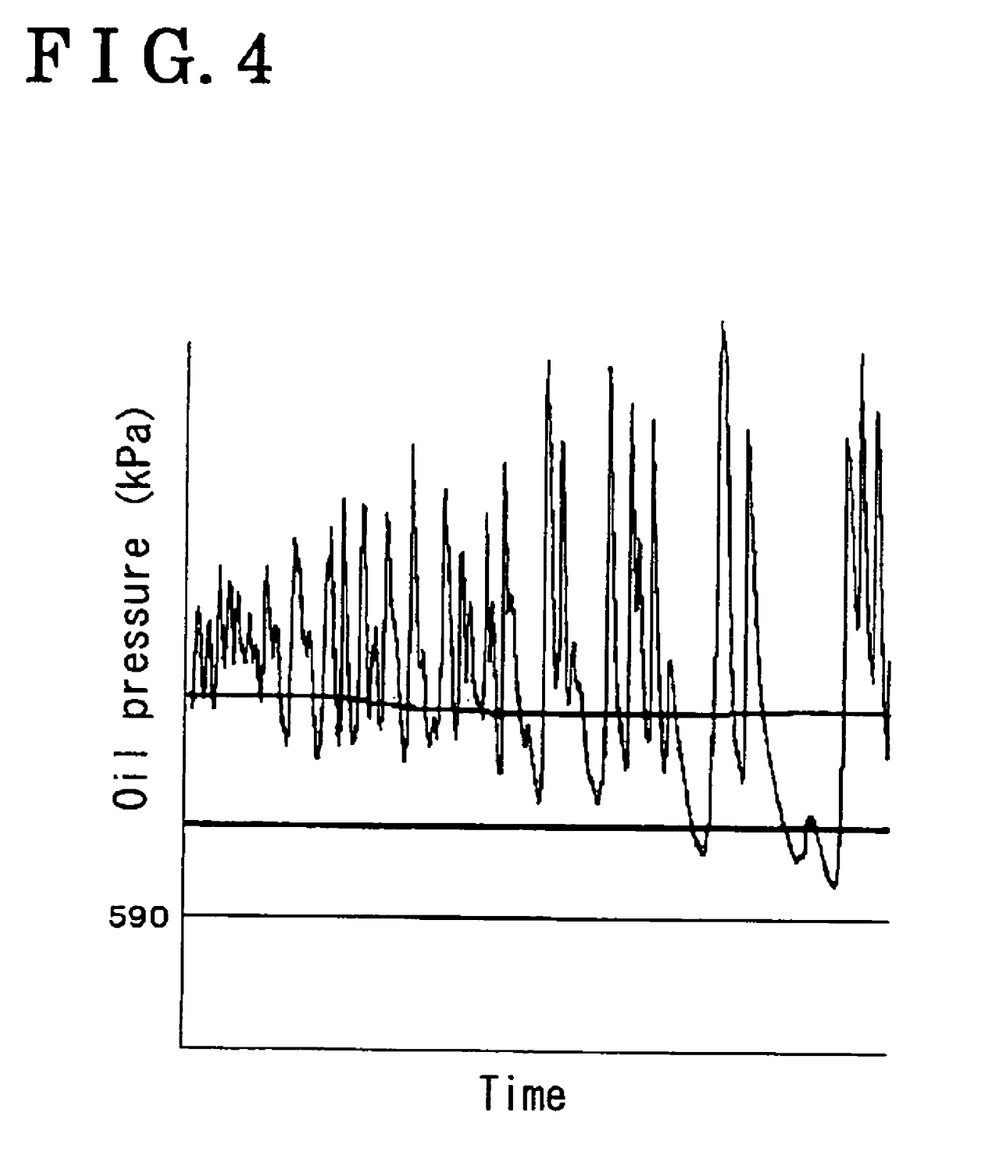
FIG. 4 illustrates a graph indicating a relationship between the oil pressure and time at low temperature according to the embodiment of the current invention.

FIG. 1 illustrates a cross sectional view of a configuration of an automatic transmission apparatus according to an embodiment of the current invention, FIG. 2 illustrates a schematic skeleton diagram of the configuration of the automatic transmission apparatus according to the embodiment of the current invention, FIG. 3 illustrates a cross sectional view of an enlarged elements along a line A—A in FIG. 1 indicating an engagement between a sun gear hub and a second clutch drum according to the embodiment of the current invention, and FIG. 4 illustrates a graph indicating a relationship between the oil pressure and time at low temperature according to the embodiment of the current invention.

An automatic transmission apparatus 1, being an automatic transmission type, includes an automatic transmission case 2, an oil pan 3, a strainer 4, a valve body 5, an oil pump 6, a torque converter 100, an input shaft 10, a first clutch 20, a second clutch 30, a sun gear 40, a canceller 50, a ring gear 60, a first pinion gear 61, a second pinion gear 62, a carrier 63, a third clutch 70 and an output shaft 90.

The automatic transmission case 2 houses components of the automatic transmission apparatus, and the oil pan 3 being a tray-shaped component for storing oil is attached to the automatic transmission case 2 at lower portion thereof. The strainer 4 is provided within the oil pan 3 for filtering the oil pumped from the oil pan 3 to get rid of foreign compound.

The valve body 5 controlling the oil pressure of the automatic transmission apparatus 1 includes an oil pass, a regulator valve and oil pass switching valve (not shown), and the oil pass is shaped like a maze and connecting to each valve. The oil pump 6 pumps and provides the oil to each component within the transmission 1 at a predetermined oil pressure.

The input shaft 10 transmits the rotation force applied from an engine via the torque converter 100. The input shaft 10 is spline-engaged with turbine 100b of torque converter 100 which includes pump 100a. The input shaft 10 includes an oil pass 11 at inner portion thereof and a hole 12 through which the oil flows from the oil pass 11 to a canceller chamber 51. The input shaft 10 is constantly connected to the first clutch 20, the second clutch 30 and the sun gear 40; and rotated integrally with such components.

The first clutch 20 constantly engaging with the input shaft 10 is used for forward driving and including a first clutch drum 21, which constitutes first member, and a spline 25. The first clutch 20 rotates integrally with a first clutch hub 22 by engaging with a clutch plate 26 provided therebetween. The first clutch drum 21 is provided at outer peripheral side of the first clutch hub 22 and connected to the first clutch hub 22 through the clutch plate 26. A hole 23 is formed at the first clutch drum 21 through which the oil flows from the canceller 50 side to a space 36 formed near the engaging point between a sun gear hub 41 and a second clutch drum 31 which constitutes second member. The first clutch hub 22 is constantly engaged with a sun shaft 71 and including a hole 24 through which the oil flows from a window 52 of the canceller 50 to the hole 23 side of the first clutch drum 21 for lubing the clutch plate 26 in being disengaging condition. The spline 25 is an inner spline for constantly engaging with the second clutch 30.

The second clutch 30 is a forward driving clutch welded to the input shaft 10 through the first clutch 20 and including the second clutch drum 31, a spline 34 and a spline 35. The second clutch 30 rotates integrally with a second clutch hub 32 by engaging with a clutch plate 37 provided therebetween. The drum-shaped second clutch drum 31 provided at outer peripheral side of the second clutch hub 32 being constantly engaging with the sun gear hub 41 is engageable with the second clutch hub 32 through the clutch plate 37 provided therebetween. The second clutch hub 32 covering the outer peripheral surface of the first clutch drum 21 keeping a predetermined clearance therebetween is continuously connected to the carrier 81 of a planetary gear set cluster 80 and including a hole 33 through which the oil flows from the canceller 50 side to the space 36 near a connecting portion between the sun gear hub 41 and the second clutch drum 31. The planetary gear set cluster 80 for switching plural rotations speed or rear driving has a known configuration. The spline 34 is an outer spline type for continuously connecting to the spline 25 of the first clutch 20. The spline 35 is an inner spline type for continuously engaging with the sun gear hub 41 and provided near a top end portion of the second clutch drum 31.

The planetary gear set includes the sun gear 40 being an external gear type attached to a center shaft and engages with the input shaft through the first clutch 20 and the second clutch 30. The sun gear hub 41 is integrally provided at the one end of the sun gear 40. The drum-shaped sun gear hub 41 includes a cylindrical portion extending in a direction away from the sun gear 40 at the outer peripheral portion thereof, and a spline 44 is formed at the outer peripheral surface of the cylindrical portion and engaging with the spline 35 of the second clutch drum 31. The spline 44 being an outer spline type includes depressed portions 42 at the groove bottoms thereof. Clearances 43 are formed between the depressed portions 42 and the inner surface of the second clutch drum 31 when the spline 44 engages with the spline 35 of the second clutch drum 31 (shown in FIG. 2 and FIG. 3), and the oil flows from inside to outside of the sun gear hub 41 through the clearances 43. The sun gear hub 41 is integrally provided at the other end of the sun gear 40.

The canceller 50 reducing the centrifugal difference pressure applied to a piston is provided inside of the first clutch 20 and including the window 52 through which the oil remains in the canceller chamber 51 flows to the first clutch 20 side.

The planetary gear set includes the ring gear 60 being an internal gear type. The ring gear 60 is provided concentrically with the center shaft and engaging with the second pinion gear 62. The ring gear 60 integrally rotates with the ring gear 82 of the planetary gear set cluster 80 through the third clutch 70 on engaging condition with the clutch plate. The planetary gear set also includes the first pinion gear 61 being an internal gear type. The first pinion gear 61 is provided concentrically with the center shaft and engaging with the sun gear 40 and the second pinion gear 62. The planetary gear set further includes the second pinion gear 62. The second pinion gear 62 is engaging with the first pinion gear 61 and the ring gear 60 respectably and provided concentrically with the center shaft. The planetary gear set cluster 80 likewise includes the carrier 63 fixed to the automatic transmission case 2 for rotatably supporting the first pinion gear 61 and the second pinion gear 62.

A certain operation of the automatic transmission apparatus according to the preferred embodiment of the present invention will be described hereinbelow in detail with reference to the accompanying drawings.

When the vehicle is in the idling condition, only components engaging with the input shaft such as the first clutch 20, the second clutch 30 and the sun gear hub 41 in FIG. 1 are rotated. The oil returned to the oil pan 3 at this moment is used for lubing or cooling down the components in the automatic transmission apparatus.

An oil flow on the idling condition will be explained as follows.

The oil whose pressure has been regulated flows from the oil pump 6 and flows into the oil pass 11 of the input shaft 10. Then the oil flows into the canceller chamber 51 through the hole 12 formed at the input shaft 10. After the canceller chamber 51 is filled up with the oil, the oil flows out in the outer direction relative to the shaft due to centrifugal force through the window 52 formed at the canceller 50. The oil flows out through the hole 24 formed at the first clutch hub 22 and flows into the first clutch 20 for lubing. The oil further flows into the space 36 through the hole 23 formed at the first clutch drum 21 and the hole 33 formed at the second clutch hub 32. In the same way, the oil flows out from the second clutch 30 (clutch plate 37) and flows into the space 36.

The oil remains in the space 36 surrounded by the second clutch hub 32, the sun gear hub 41, the second clutch drum 31 and the clutch plate 37 can flow out through the clearances 43 formed inward direction between the depressed portions 42 of the spline 44 of the sun gear hub 41 and the spline 35 of the second clutch drum 31. In this configuration, the oil spreading inside the automatic transmission apparatus is returned into the oil pan 3 as much as possible. The depressed portions 42 is formed by press process.

Figure 6:
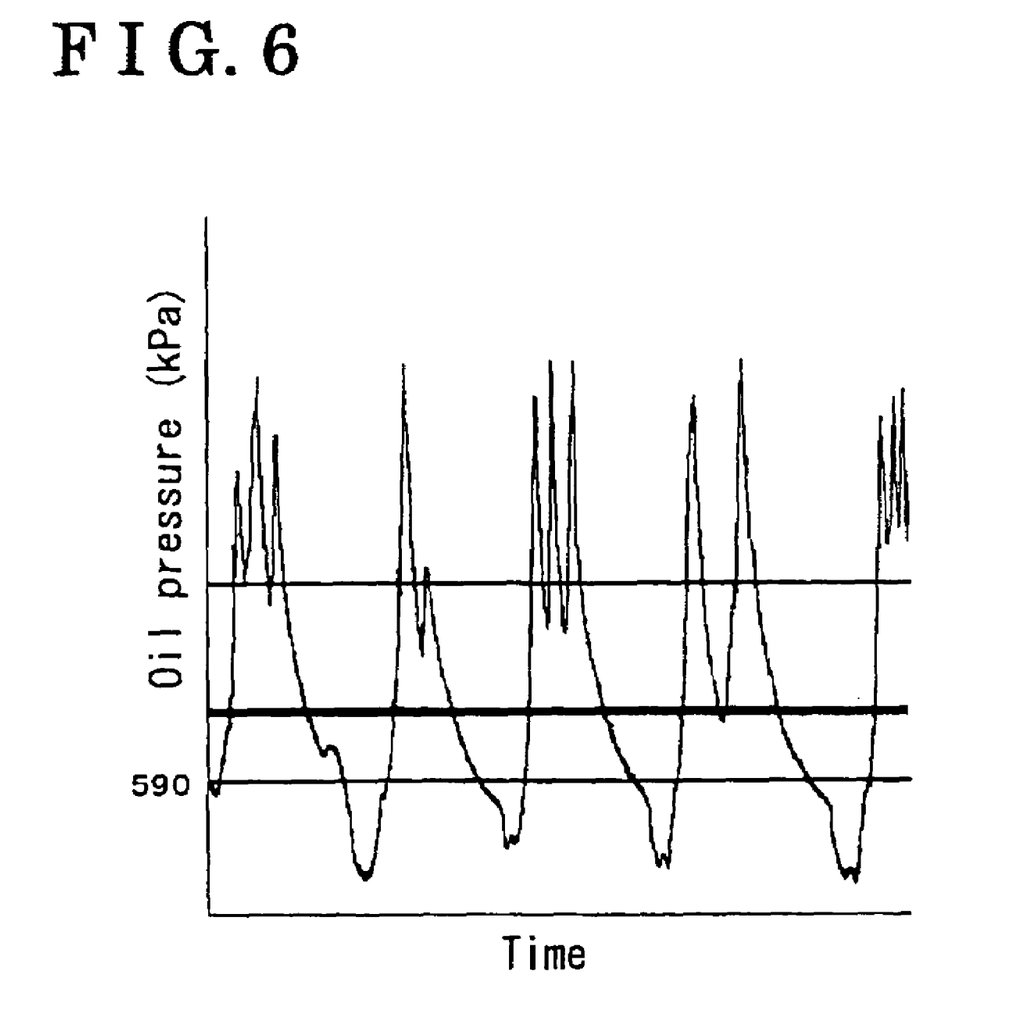
FIG. 6 illustrates a graph indicating a relationship between the oil pressure and time at low temperature according to the embodiment of the known automatic transmission apparatus.

Benchmark results of the oil pressure waveforms of the automatic transmissions apparatus are shown in FIG. 4 and FIG. 6. The oil pressure waveform of the automatic transmission apparatus according to the current invention using the sun gear hub shown in FIG. 3 (current embodiment) is indicated in FIG. 4, and the oil pressure waveform of the automatic transmission apparatus according to the known invention using the known sun gear hub shown in FIG. 5 (comparative example) is indicated in FIG. 6. As shown in FIG. 6, the oil pressure in the comparative example significantly declines, especially; significant declinations of the oil pressure being below the minimum standard line 590 kPa have been found four times during a predetermined time.

On the other hand, any significant declination of the oil pressure has not been found in the current embodiment, further more, the oil pressure is never below the minimum standard line 590 kPa as shown in FIG. 4 because lager amount of oil comparing to the comparative example returns into the oil pan 3 in the configuration of the current embodiment according to the current invention. In the benchmark tests, the vehicle is in the idling condition, the oil temperature is −30°, and 12.1 litter oil is used.

According to the current invention, oil flowing inside the automatic transmission apparatus returns into the oil pan as much as possible because the oil flows out through spaces formed between depressed portions formed at the bottom of the groove of the sun gear hub and clutch dram. In addition, the spaces are designed to be moderately large in consideration of a situation dealing with oil being thick at low temperature.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. An automatic transmission apparatus comprising:
a clutch drum rotating integrally with an input shaft and including a first cylindrical portion having an inner spline at an inner peripheral surface thereof;
a hub including a second cylindrical portion having an outer spline for engaging with the inner spline of the clutch drum and an inwardly directed depressed portion located between two adjacent regions where the inner and outer splines engage one another; and
a clearance which establishes a communication between an inner portion surrounded by the hub and an outer portion outside the clutch drum, the clearance being formed between an outer surface of the depressed portion of the hub and the inner peripheral surface of the clutch drum, the clearance possessing a radial dimension greater than a radial dimension between an inner surface of the inner spline and an outer surface of the outer spline in the two adjacent regions where the inner and outer splines engage one another.

2. An automatic transmission apparatus according to claim 1, wherein the radial dimension of the clearance gradually increases in a circumferential direction of the depressed portion from a region adjacent where the inner and outer splines engage one another to a middle portion of the depressed portion.

3. An automatic transmission apparatus according to claim 1, wherein the clutch drum rotates integrally with the input shaft and is connected with the input shaft by welding.

4. An automatic transmission apparatus according to claim 3, wherein the input shaft is engaged with a torque converter through spline engagement.

5. An automatic transmission apparatus according to claim 1, wherein the depressed portion is formed at part of or all of groove bottoms of the outer spline of the hub.

6. An automatic transmission apparatus according to claim 5, wherein the depressed portion is formed by a pressing process.

* * * * *